United States Patent
Ghali

(10) Patent No.: US 9,057,472 B2
(45) Date of Patent: Jun. 16, 2015

(54) INSULATION MATERIAL

(71) Applicant: Ragui Ghali, Markham (CA)

(72) Inventor: Ragui Ghali, Markham (CA)

( * ) Notice: Subject to any disclaimer, the term of this patent is extended or adjusted under 35 U.S.C. 154(b) by 0 days.

(21) Appl. No.: 14/058,366

(22) Filed: Oct. 21, 2013

(65) Prior Publication Data

US 2014/0120304 A1 May 1, 2014

Related U.S. Application Data

(60) Provisional application No. 61/721,170, filed on Nov. 1, 2012.

(51) Int. Cl.
| | |
|---|---|
| F16L 59/07 | (2006.01) |
| B32B 15/08 | (2006.01) |
| B32B 3/28 | (2006.01) |
| C04B 28/02 | (2006.01) |
| F16L 59/08 | (2006.01) |

(52) U.S. Cl.
CPC ............. *F16L 59/07* (2013.01); *B32B 15/08* (2013.01); *B32B 3/28* (2013.01); *Y10T 428/24149* (2015.01); *Y10T 428/24661* (2015.01); *B32B 2307/304* (2013.01); *C04B 28/02* (2013.01); *F16L 59/08* (2013.01)

(58) Field of Classification Search
None
See application file for complete search history.

(56) References Cited

U.S. PATENT DOCUMENTS

| | | | |
|---|---|---|---|
| 3,640,832 A | 2/1972 | Kurz | |
| 4,281,802 A | 8/1981 | Burley | |
| 4,533,583 A * | 8/1985 | May | 428/69 |
| 4,636,416 A * | 1/1987 | Kratel et al. | 428/69 |
| 5,270,092 A * | 12/1993 | Griffith et al. | 428/178 |
| 7,065,575 B1 | 6/2006 | Machiraju et al. | |
| 2006/0172095 A1* | 8/2006 | Elsaesser | 428/34.2 |
| 2009/0301019 A1* | 12/2009 | Baldock et al. | 52/741.4 |
| 2010/0083417 A1* | 4/2010 | Alder et al. | 5/420 |
| 2011/0307976 A1* | 12/2011 | Ploechinger | 428/116 |
| 2012/0042981 A1* | 2/2012 | Ray et al. | 428/215 |

FOREIGN PATENT DOCUMENTS

| | | |
|---|---|---|
| CA | 2067683 | 3/1994 |
| KR | 20110072793 A * | 6/2011 |

* cited by examiner

*Primary Examiner* — David Sample
*Assistant Examiner* — Nicholas W Jordan
(74) *Attorney, Agent, or Firm* — Gowling Lafleur Henderson LLP

(57) ABSTRACT

A flexible or rigid heat-insulation material consisting of a sheet of at least one layer of closed-cell gas bubbles 1/16 inch to 1 inch in size filled with a gas selected from helium, argon, neon, krypton, xenon, carbon dioxide, and chlorodifluoromethane, and mixtures thereof. At least one heat reflective layer of aluminum film is adhesively attached to the layer of gas bubbles or an aluminum film is vapor-deposited on the layer of gas bubbles.

13 Claims, 1 Drawing Sheet ic insulation with one layer of bubble pack insulation.

INSULATION MATERIAL

CROSS-REFERENCE TO RELATED APPLICATION

This application claims priority from U.S. Provisional Application Ser. No. 61/721,170, filed Nov. 1, 2012, the contents of which are incorporated herein by reference.

FIELD OF THE INVENTION

This invention relates to thermal insulation and, more particularly, relates to an improved flexible or rigid heat-insulation sheet material.

BACKGROUND OF THE INVENTION

Heat is transferred by radiation, conduction or convention. Insulation reduces the rate of heat flow from a warm source, such as the warm interior of a building to a cold exterior in the winter or from a warm exterior to the cool interior of a building in the summer, by interfering with and retarding radiant heat transfer and conduction of heat through solid materials. The resistance to heat flow can be increased by providing thicker walls and less heat conductive wall substrates. All materials such as wood, plaster, dry-wall, glass, glass fiber, closed-cell, and open-cell foam, and air spaces transfer heat, albeit at different rates of heat transfer.

The slower the rate of heat flow, the better the "R-value", which is a measure of the resistance to heat flow across a one-inch thickness of a material. For example, enclosed air has an approximate R-value of 1.0, near-vacuum has an approximate R-value of 40, metal has an approximate R-value of 0.2, glass fiber has an approximate R-value of 2.8 to 3.0, extruded styrofoam™ has an approximate R-value of 4.3, and closed-cell air bubbles, known as bubble pack, has an approximate R-value of 1.

U.S. Pat. No. 7,056,575 issued Jun. 6, 2006 discloses a multi-layer insulation comprised of a pair of bubble-pack insulation sheets laminated on both sides of a polyethylene film, and a pair of aluminum foil films adhesively mounted on the outer surfaces of the bubble-pack sheets. The closed cells of the bubble pack are filled with air.

Canadian Patent No. 2,067,683 issued Mar. 1, 1994 discloses a flexible insulation having a central section composed of air-bubble cushioning material having a layer of aluminium foil extruded onto each side of the cushioning material for use in hockey rinks.

SUMMARY OF THE INVENTION

I have found surprisingly that by substituting either: a noble gas typified by helium, argon, xenon, krypton and neon, or $CO_2$, or chlorodifluoromethane (also marketed under the name FREON™), for air, in bubble packs having closed-cell bubbles in the size range of at least 1/16 inch to up to one inch in diameter, preferably 1/8 inch to 1/2 inch in diameter, preferably formed of an elastic film having a thickness of about 1 mil, the R-value of the bubble pack is increased from about 1 to about 3-11.

In its broad aspect, the heat insulating material of the invention comprises a sheet of at least one layer of closed-cell gas bubbles filled with a noble gas selected from the group consisting of helium, argon, neon, krypton and xenon, or carbon dioxide, or chlorodifluoromethane. The sheet of closed-cell gas bubbles is formed of bubbles having a size in the range of 1/16 inch to one inch, preferably in the range of 1/8 inch to 1/2 inch, in diameter. At least one heat reflective layer is laminated onto a surface of the layer of closed-cell gas bubbles. The sheet of closed-cell gas bubbles is fabricated of 1 mil thick film of polyethylene, nylon embedded in polyethylene, or ethylene vinyl alcohol (EVOH) and the heat reflective layer is a film of aluminum vapor-deposited on the sheet of bubbles or aluminum foil adhered to the sheet of bubbles by an adhesive such as ethylene vinyl acetate (EVA).

This invention is useful as an insulating sheet material for a variety of situations in which insulation is required. For instance, without limiting the potential uses of my invention, it is appropriate for building construction in which an effective insulating material is required to provide insulation in walls and ceilings. Another application for the insulation material is in the manufacture of packaging materials for items which must be kept cold during shipping, such as foods, medicines, and biological materials.

BRIEF DESCRIPTION OF THE DRAWINGS

The product of the invention will now be described with reference to the accompanying drawings, in which.

DESCRIPTION OF THE PREFERRED EMBODIMENTS

Figure 1:
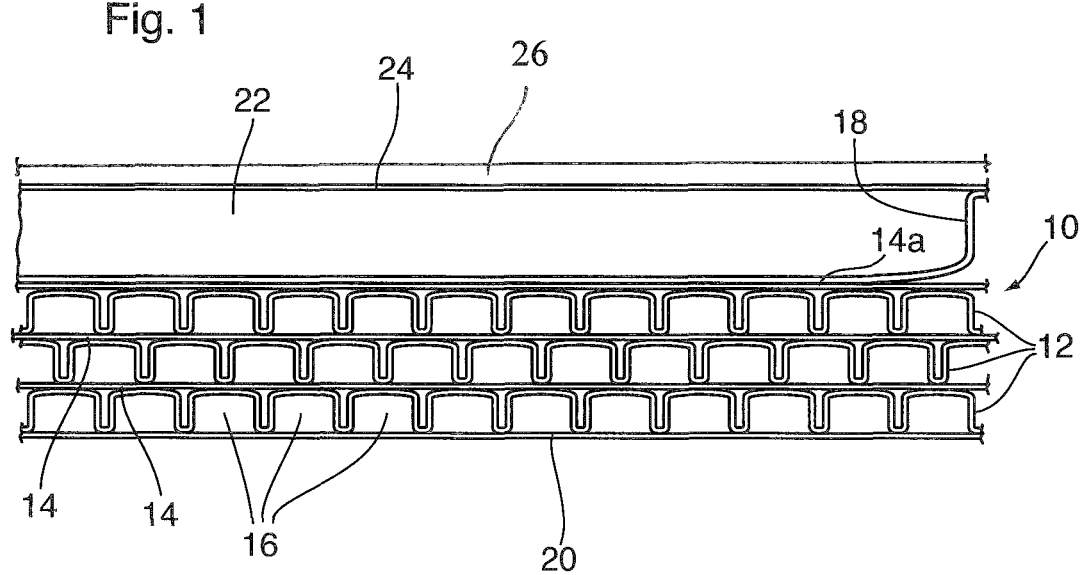
FIG. 1 is a cross-section of an embodiment of my invention.

FIG. 1 is a sectional view of an embodiment of my invention showing a sheet 10 consisting of three gas-filled bubble pack layers 12 laminated together at abutting surfaces by a thin metal heat reflective foil 14, such as aluminium-polyester foil having a thickness of about 1 mil. The closed cell gas bubbles 16 have a diameter in the range of 1/16 inch to one inch, preferably 1/8 inch to 1/2 inch, and are formed of a thin elastic laminate film 18 consisting of polyethylene, nylon embedded in polyethylene or EVOH, having a film thickness of about 1 mil. Conventional bubble pack film has a thickness of about 6 mil, but it has been found that thin film provides enhanced resistance to heat transfer with increase of R-value. Although it will be understood that I am not bound by hypothetical considerations, it is believed that reduction of the film thickness from 6 mil to 1 mil renders the film 18 more flexible and elastic, and thereby easier to stretch to accommodate gas expansion within the bubbies and to retain heat energy with minimum heat transfer to adjacent cells.

Each gas-filled bubble pack layer 12 preferably has a heat reflective metallized film 14, preferably consisting of aluminum vapor deposited on polyester film and heat laminated on one side such as by radiant heating, or aluminum foil adhered to the bubble pack by use of a hot-melt adhesive such as EVA. Although three layers 12 of bubble pack are shown heat laminated together, it will be understood that one or more layers are contemplated depending on insulation requirements. Similar to film 18, the layer 20 may be made of a thin elastic laminate film such as polyethylene, nylon embedded in polyethylene, or EVOH.

The substitution for air of a noble gas selected from helium, argon, xenon, krypton and neon, or $CO_2$, or chlorodifluoromethane, or a mixture thereof, effectively increases the R-value from about 1 to about 3-11.

The addition of a one-inch air space 22 formed by film of polyethylene, nylon embedded in polyethylene or EVOH between a heat source and a heat reflective layer 14a increases the R-value up to a total R-value of about R-13 for a composite product. An additional heat reflective metal foil layer 24 preferably is provided at the boundary of the air space 22 opposite the gas-filled bubble pack layers.

Figure 2:
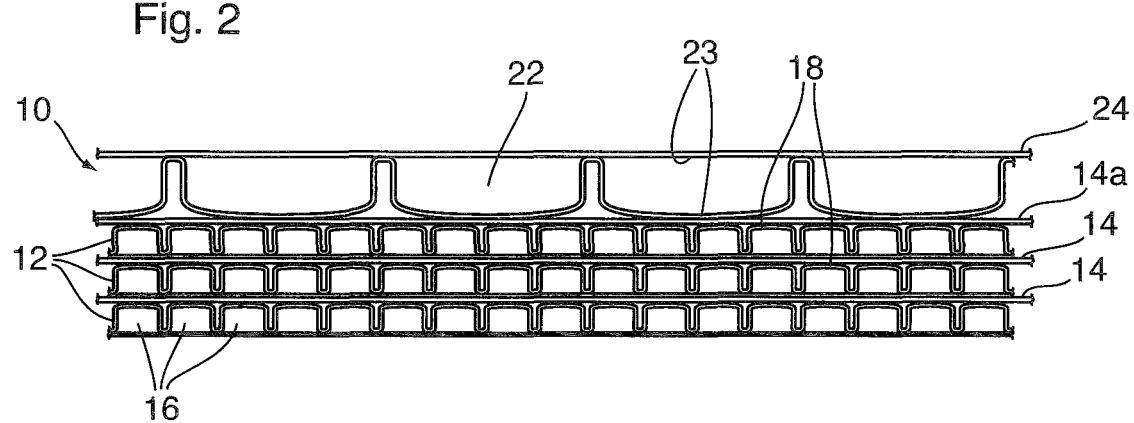
FIG. 2 is a cross-section of an alternate embodiment of my invention.

Similarly, FIG. 2 is a sectional view of an alternate embodiment of my invention, which is similar to that seen in FIG. 1, but differs in that the air space 22 takes on a different form. As shown, the film 23 defining the boundaries of air space 22 is adhered at periodically spaced points to the heat reflective metal foil layer 24, to form partitions within the air space 22. This additional feature increases the flexibility of the resulting insulation material which may then be more readily folded or bent in use with decreased risk of puncture which would compromise the entirety of air space 22.

The single or composite plural layers can be flexible, capable of being supplied in rolls, or can be rigid, with one or both structural walls adhered to the side of the sheet opposite the heat source side. A structural wall 26 may be formed of a rigid building sheet material such as drywall, plywood, polystyrene foam, or composite board, or may be formed of other relatively rigid yet lightweight materials such as corrugated or honeycomb cardboard.

Tests were conducted to establish the R-value of air-filled cells of bubble packs, shown in Table 1. The tests shown below were for a single layer of bubble pack in the size indicated.

TABLE 1

| Bubble Pack Size (height × width × length) | R-Value |
|---|---|
| 1" × 1" × 1" | 1 |
| 0.75" × 1" × 1" | 1 |
| ½" × 1" × 1" | 1 |
| ½" × ½" × 1" | 1 |
| ¾" × ¾" × ¾" | 1 |
| ½" × ½" × ½" | 1 |
| ¼" × ¼" × ¼" | 1 |
| ⅛" × ⅛" × ⅛" | 1 |

Comparative tests were conducted to establish the R-value of a krypton/argon gas mix consisting of 80% krypton and 20% argon, shown in Table 2.

TABLE 2

| Bubble Pack Size (height × width × length) | R-Value |
|---|---|
| 1" × 1" × 1" | 3 |
| 0.75" × 1" × 1" | 3 |
| ½" × 1" × 1" | 3 |
| ½" × ½" × 1" | 3 |
| ¾" × ¾" × ¾" | 3 |
| ½" × ½" × ½" | 8 |
| ¼" × ¼" × ¼" | 8 |
| ⅛" × ⅛" × ⅛" | 8 |
| 1/16" × 1/16" × 1/16" | 4 |

It was found that gas-filled bubble packs having a cell size in the range of ⅛ inch to ½ inch had an optimum R-value of 8.

A further test was conducted using a bubble pack size of ½"×1"×1", with chlorodifluoromethane used instead of a noble gas mixture. An R-value of 8 was also achieved.

Reduction of thickness of the elastic film of the bubble pack to 1 mil from 6 mil, when testing bubble packs having a cell size in the range of ⅛ inch to ½ inch, increased the R-value to the range of 9-11.

As well the addition of a 1-inch air space layer as described earlier, to a bubble pack having a cell size in the range of ⅛ inch to ½ inch, filled with the 80% krypton/20% argon mixture or with chlorodifluoromethane, further increased the R-value to 13.

The present invention provides a number of important advantages. The substitution of a noble gas, $CO_2$, or chlorodifluoromethane for air in bubble packs surprisingly increases the R-value of the bubble packs. Reducing the film thickness of the bubble packs further enhances the R-value. A further advantage of my invention is that the substituted gas in the bubble packs is non combustible and adds fire retardant properties to the material by eliminating the presence of oxygen in areas in which combustion might otherwise occur. This feature is particularly useful for the invention when used in building construction.

It will be understood that other embodiments and examples of the invention will be readily apparent to a person skilled in the art, the scope and purview of the invention being defined in the appended claims.

The invention claimed is:
1. A heat insulating material comprising a sheet having:
a first layer and a second layer of closed-cell gas bubbles filled with a noble gas, the closed-cell gas bubbles of the first layer being formed by depressions formed in a lower surface of a first laminate film and sealed by an upper surface of a flat laminate film, the closed-cell gas bubbles of the second layer being formed by depressions formed in a lower surface of a second laminate film and sealed by an upper surface of a flat foil, an upper surface of the first laminate film being bonded to a lower surface of the flat foil;
a heat reflective layer, a lower surface of the heat reflective layer being bonded to an upper surface of the second laminate film; and,
a third layer having one or more air spaces filled with air, the one or more air spaces of the third layer being formed by one or more respective depressions formed in an upper surface of a third laminate film and sealed by a flat foil layer, a lower surface of the third laminate film being bonded to an upper surface of the heat reflective layer.

2. A heat insulating material as claimed in claim 1, wherein the closed-cell gas bubbles of the first layer and the second layer are formed bubbles having a size in the range of 1/16 inch to one inch.

3. A heat insulating material as claimed in claim 1, wherein the closed-cell gas bubbles of the first layer and the second layer are formed bubbles having a size in the range of ⅛ inch to ½ inch.

4. A heat insulating material as claimed in claim 1, wherein the flat foil and the flat foil layer are heat reflective.

5. A heat insulating material as claimed in claim 1, wherein the first laminate film, the second laminate film, and the third laminate film are fabricated of a 1 mil thick film of polyester, nylon embedded in polyethylene, or ethylene vinyl alcohol.

6. A heat insulating material as claimed in claim 5, wherein the heat reflective layer is a film of aluminum adhered to the upper surface of the second laminate film formed of ethylene vinyl alcohol by ethylene vinyl acetate.

7. A heat insulating material as claimed in claim 1, wherein the heat reflective layer is a film of aluminum vapor-deposited on the upper surface of the second laminate film or aluminum foil adhered to the upper surface of the second laminate film.

8. A heat insulating material as claimed in claim 1, wherein each air space of the one or more air spaces is a one-inch air space.

9. A heat insulating material as claimed in claim 1, further comprising a rigid layer.

10. A heat insulating material as claimed in claim 9, wherein the rigid layer is made from a material selected from the group consisting of drywall, plywood, polystyrene foam, honeycomb cardboard, or corrugated cardboard.

11. A heat insulating material as claimed in claim 9, wherein the rigid layer is a structural wall.

12. A heat insulating material as claimed in claim 1, wherein the noble gas is argon.

13. A heat insulating material as claimed in claim 1, wherein the noble gas is selected from the group consisting of helium, argon, neon, krypton, xenon, carbon dioxide, and chlorodifluoromethane, and mixtures thereof.

* * * * *